(12) United States Patent
Wang et al.

(10) Patent No.: US 11,327,021 B1
(45) Date of Patent: May 10, 2022

(54) METHOD AND DEVICE FOR CROP CANOPY CHLOROPHYLL FLUORESCENCE THREE-DIMENSIONAL DISTRIBUTION INFORMATION ACQUISITION

(71) Applicant: JIANGSU UNIVERSITY, Zhenjiang (CN)

(72) Inventors: Jizhang Wang, Zhenjiang (CN); Rongrong Gu, Zhenjiang (CN); Yun Zhang, Zhenjiang (CN); Junjie Yuan, Zhenjiang (CN); Pingping Li, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/419,317

(22) PCT Filed: Jan. 15, 2021

(86) PCT No.: PCT/CN2021/072032
§ 371 (c)(1),
(2) Date: Jun. 29, 2021

(87) PCT Pub. No.: WO2021/212932
PCT Pub. Date: Oct. 28, 2021

(30) Foreign Application Priority Data

Apr. 23, 2020 (CN) .......................... 202010328726.3

(51) Int. Cl.
*G06K 9/00* (2022.01)
*G01N 21/64* (2006.01)
(Continued)

(52) U.S. Cl.
CPC ....... *G01N 21/6486* (2013.01); *G01B 11/002* (2013.01); *G01B 11/03* (2013.01);
(Continued)

(58) Field of Classification Search
None
See application file for complete search history.

(56) References Cited

U.S. PATENT DOCUMENTS

| | | |
|---|---|---|
| 9,921,161 B1 | 3/2018 | Feldkhun |
| 2018/0018537 A1* | 1/2018 | Kim ..................... H04N 5/2256 |
| 2019/0323966 A1 | 10/2019 | Wang et al. |

FOREIGN PATENT DOCUMENTS

| | | |
|---|---|---|
| CN | 105572091 A | 5/2016 |
| CN | 106546568 A | 3/2017 |

(Continued)

*Primary Examiner* — Wei Wen Yang
(74) *Attorney, Agent, or Firm* — Bayramoglu Law Offices LLC

(57) ABSTRACT

A method and a device for crop canopy chlorophyll fluorescence three-dimensional distribution information acquisition are provided. The device includes a Cropobserver canopy chlorophyll fluorescence detection device, a 3D camera and a computer system. The 3D camera is connected to the computer system, Visual studio 2017 and MATLAB 2018 are run in the computer system, and the Visual studio 2017 calls a point cloud library and a computer vision library to realize three-dimensional visualization of chlorophyll fluorescence information of crops to be tested. By means of the new method and the new device, the problem of incompleteness of the two-dimensional chlorophyll fluorescence information distribution acquired is solved, overall 3D visual distribution of crop canopy chlorophyll fluorescence distribution is realized, and important technical support is provided for acquisition and research of three-dimensional visual distribution information of chlorophyll fluorescence of the whole crop canopy.

18 Claims, 5 Drawing Sheets

(51) Int. Cl.
*G06T 7/62* (2017.01)
*G01B 11/03* (2006.01)
*G01B 11/00* (2006.01)
*G06T 7/136* (2017.01)
*G06T 7/12* (2017.01)
*G01N 21/63* (2006.01)

(52) U.S. Cl.
CPC ............ *G01N 21/6456* (2013.01); *G06T 7/12* (2017.01); *G06T 7/136* (2017.01); *G06T 7/62* (2017.01); *G01N 2021/635* (2013.01)

(56) References Cited

FOREIGN PATENT DOCUMENTS

| | | |
|---|---|---|
| CN | 109115776 A | 1/2019 |
| CN | 110554017 A | 12/2019 |
| CN | 210090309 U | 2/2020 |
| CN | 111551530 A | 8/2020 |
| WO | WO-2016176612 A1 * 11/2016 | ............... A01G 7/00 |

* cited by examiner

METHOD AND DEVICE FOR CROP CANOPY CHLOROPHYLL FLUORESCENCE THREE-DIMENSIONAL DISTRIBUTION INFORMATION ACQUISITION

CROSS REFERENCE TO THE RELATED APPLICATIONS

This application is the national phase entry of International Application No. PCT/CN2021/072032, filed on Jan. 15, 2021, which is based upon and claims priority to Chinese Patent Application No. 202010328726.3, filed on Apr. 23, 2020, the entire contents of which are incorporated herein by reference.

TECHNICAL FIELD

The present invention belongs to the technical field of chlorophyll fluorescence information acquisition, and in particular, relates to a method and a device for crop canopy chlorophyll fluorescence three-dimensional distribution information acquisition.

BACKGROUND

The chlorophyll fluorescence analysis technology has the characteristics of rapid and non-invasive measurement, is a novel technology for studying the plant growth, and has been widely used in the field of plant physiological information research. At present, chlorophyll fluorescence monitoring can only obtain chlorophyll fluorescence images, and there is an urgent need to realize the three-dimensional characterization of chlorophyll fluorescence distribution characteristics on the leaves and the three-dimensional characterization of the whole canopy. The crop to be tested is a single leaf or multiple leaves, and the acquired image is two-dimensional. The health condition of the plant is identified only from the perspective of leaves, and the three-dimensional distribution of chlorophyll fluorescence information of the whole crop canopy cannot be realized.

In order to acquire the three-dimensional chlorophyll fluorescence of crops, Chinese Patent Application No. CN106546568A discloses a method and device for obtaining three-dimensional chlorophyll fluorescence image information of plants. In this method, chlorophyll fluorescence image and grayscale image information of the plant to be tested at different angles are acquired, chlorophyll fluorescence images and grayscale images of the plant to be tested are reconstructed using a three-dimensional reconstruction method, and the three-dimensional fluorescence image is corrected using a three-dimensional grayscale image, to obtain a final three-dimensional chlorophyll fluorescence image. However, this method requires the acquisition of chlorophyll fluorescence images of the crops from different angles, and cannot realize the characterization of the chlorophyll fluorescence three-dimensional distribution of a crop canopy.

CropObserver, as a novel crop canopy chlorophyll fluorescence detection device, can detect the chlorophyll fluorescence of the crop canopy in real time, but can only acquire two-dimensional data array, failing to localize the chlorophyll distribution at specific canopy positions.

SUMMARY

To overcome the drawbacks in the prior art, the present invention provides a method and a device for crop canopy chlorophyll fluorescence three-dimensional distribution information acquisition, to solve the problem that a three-dimensional visual distribution in crop canopy cannot be realized for crop canopy chlorophyll fluorescence distribution, providing important technical support for acquisition and study of three-dimensional visual distribution information of canopy chlorophyll fluorescence of the whole crop canopy.

The above technical object of the present invention is attained with the following technical means:

A method for crop canopy chlorophyll fluorescence three-dimensional distribution information acquisition, specifically including:

respectively obtaining depth images and mapped color images of laser dots emitted by a fluorescence-induced laser emitter on a background plate before and after raising by using a 3D camera, and calibrating the depth images and the mapped color images to obtain camera intrinsic matrices;

obtaining spatial coordinates of the laser dots based on pixel coordinates of edge points in the color images and depth values of the edge points in the depth images in combination with the camera intrinsic matrices; obtaining a spatial linear equation according to the spatial coordinates of the laser dots, and solving spatial coordinate $O_2(a, b, c)$ of an aperture center of the fluorescence-induced laser emitter relative to the camera;

acquiring a chlorophyll fluorescence information of a crop canopy to be tested, mapping dot sequence number coordinates (g', h') of effective chlorophyll fluorescence signals to pixel coordinates in the color images and depth information (u''', v''', d''') of the depth images; correspondingly characterizing (u''', v''', d''') to spatial coordinates (x', y', z') using an aperture center of a depth sensor in the 3D camera as a spatial coordinate origin, and correspondingly characterizing a chlorophyll fluorescence information signal sequence of the crop to be tested to spatial coordinates (x'+a, y'+b, z'+c) using the aperture center of the fluorescence-induced laser emitter as a spatial coordinate origin;

performing three-dimensional visualization of the chlorophyll fluorescence information of the crop canopy to be tested: respectively generating, based on data in Text4-Text6 by using a pointcloud function for point cloud generation, point clouds pointcloud-Yield-Kinect, pointcloud-PAR-Kinect, and pointcloud-rETR-Kinect that include spatial coordinates and chlorophyll fluorescence information and use the aperture center of the depth sensor as an origin; respectively generating, based on data in Text7-Text9 by using a pointcloud function for point cloud generation, point clouds pointcloud-Yield-CropObserver, pointcloud-PAR-CropObserver, and pointcloud-rETR-CropObserver that include spatial coordinates and chlorophyll fluorescence information and use the aperture center of the fluorescence-induced laser emitter as an origin; where the Text4 includes data x', y', z', $$\frac{100Fv}{Fm}\left(\frac{100F'_q}{F'_m}\right),$$

0, and 0, the Text5 includes data x', y', z', 0, PAR/10, and 0, the Text6 includes data x', y', z', 0, 0, and rETR, the Text7 includes data x'+a, y'+b, z'+c, $$\frac{100Fv}{Fm}\left(\frac{100F'_q}{F'_m}\right),$$

0, and 0, the Text8 includes data x'+a, y'+b, z'+c, 0, PAR/10, and 0, the Text9 includes data x'+a, y'+b, z'+c, 0, 0, and rETR;

$$\frac{Fv}{Fm}$$

is maximum photochemical efficiency of leaves under dark adaptation, $$\frac{F'_q}{F'_m}$$

is actual photochemical efficiency of leaves under light adaptation, PAR is a relative light intensity on the leaf surface, and rETR is a relative electron transfer rate in leaves; and characterizing the point clouds including the spatial coordinates and the chlorophyll fluorescence information to a separated green crop point cloud by using a pcshowpair( ) function, to form a three-dimensional visual distribution of the chlorophyll fluorescence information on the crop canopy.

Further, the spatial coordinates of the laser dots are expressed as M(x, y, z), and $$\begin{cases} x = \frac{(u-u_0) \times d}{sf_x} \\ y = \frac{(v-v_0) \times d}{sf_{y_x}} \\ z = \frac{d}{s} \end{cases}$$

where u, v, and d are pixel coordinates of the laser dots in the image, s is a ratio of a depth value to an actual depth, $f_x$ and $f_y$ respectively represent focal lengths of the camera on x axis and y axis, and $(u_0, v_0)$ are pixel coordinates of an aperture center of the camera.

Further, $$\frac{100Fv}{Fm} \left( \frac{100F'_q}{F'_m} \right),$$

PAR/10, and rETR have a value range of 0-255.

Further, dot sequence numbers (g, h) corresponding to pixel coordinates $(u_{A1}, v_{A1})$, $(u_{B1}, v_{B1})$, $(u_{C1}, v_{C1})$, and $(u_{D1}, v_{D1})$ of edge points of the mapped color images are respectively (1, 1), (e, 1), (e, f), and (1, f), and pixel coordinates, which are corresponding to the dot sequence numbers (g, h), in the depth images captured by the camera are recorded as points (u", v"), where u"=(g−1)$\Delta_x$+$u_{D1}$, and v"=(h−1)$\Delta_y$+$v_{D1}$, where e is the number of dots generated by the canopy chlorophyll fluorescence detection device in a row direction, and f is the number of dots generated by the canopy chlorophyll fluorescence detection device in a column direction.

Still further, u'''=(g'−1)$\Delta_x$+$u_{D1}$, v'''=(h'−1)$\Delta_y$+$v_{D1}$, where $\Delta_x$ is a pixel distance between neighboring dots generated by the fluorescence-induced laser emitter in the row direction, and $\Delta_y$ is a pixel distance between neighboring dots generated by the fluorescence-induced laser emitter in the column direction.

Still further, $$\Delta_x = \frac{p_x}{e-1}, \text{ and } \Delta_y = \frac{p_y}{f-1},$$

where $p_x$ and $p_y$ are respectively pixel pitches corresponding to head-to-tail distances between dots generated by the canopy chlorophyll fluorescence detection device in the row direction and the column direction.

Still further, $$p_x = \frac{\sqrt{(u_{A1}-u_{B1})^2 + (v_{A1}-v_{B1})^2} + \sqrt{(u_{C1}-u_{D1})^2 + (v_{C1}-v_{D1})^2}}{2}.$$

Still further, $$p_y = \frac{\sqrt{(u_{A1}-u_{D1})^2 + (v_{A1}-v_{D1})^2} + \sqrt{(u_{B1}-u_{C1})^2 + (v_{B1}-v_{C1})^2}}{2}.$$

Further, the method further includes acquiring canopy chlorophyll fluorescence three-dimensional distribution information of different growth sequences of the crops to be tested.

A device for crop canopy chlorophyll fluorescence three-dimensional distribution information acquisition, including a canopy chlorophyll fluorescence detection device, a 3D camera and a computer system, where the 3D camera is connected to the computer system, Visual studio 2017 and MATLAB 2018 are run in the computer system, and the Visual studio 2017 calls a point cloud library and a computer vision library to realize three-dimensional visualization of chlorophyll fluorescence information of crops to be tested.

Compared with the prior art, the present invention has the following beneficial effects:

(1) According to the present invention, crop canopy chlorophyll fluorescence two-dimensional information of the crop canopy chlorophyll fluorescence detection device CropObserver is combined with the three-dimensional imaging technology of the 3D camera, and the distribution of two-dimensional chlorophyll fluorescence information obtained by the CropObserver in the crop space is realized by establishing a relationship between relative spatial coordinates of the 3D camera and the aperture center of the chlorophyll fluorescence sensor of the CropObserver. This overcomes the limitations of the method of measuring the distribution of chlorophyll fluorescence information from a single leaf or multiple leaves, and realizes the characterization of three-dimensional distribution of chlorophyll fluorescence information of the crop canopy.

(2) The present invention uses the pointcloud function for point cloud generation to generate point clouds that include spatial coordinates and chlorophyll fluorescence information and use the aperture center of the depth sensor as an origin, and generate point clouds that include spatial coordinates and chlorophyll fluorescence information and use the aperture center of the fluorescence-induced laser emitter as an origin, thereby solving the problem of incompleteness of the two-dimensional chlorophyll fluorescence information distribution acquired, and realizing overall 3D visual distribution of crop canopy chlorophyll fluorescence distribution.

(3) According to the present invention, chlorophyll fluorescence information of different growth sequences of the crop canopy is acquired, thereby solving the problem of missing of information about the bottom of the crop canopy due to blocking by the top leaves.

BRIEF DESCRIPTION OF THE DRAWINGS

FIG. 3A is a diagram showing a position calibration and point selection process of CropObserver and the 3D camera, and FIG. 3B is a diagram showing a position calibration and point selection result of CropObserver and the 3D camera.

Figure 1:
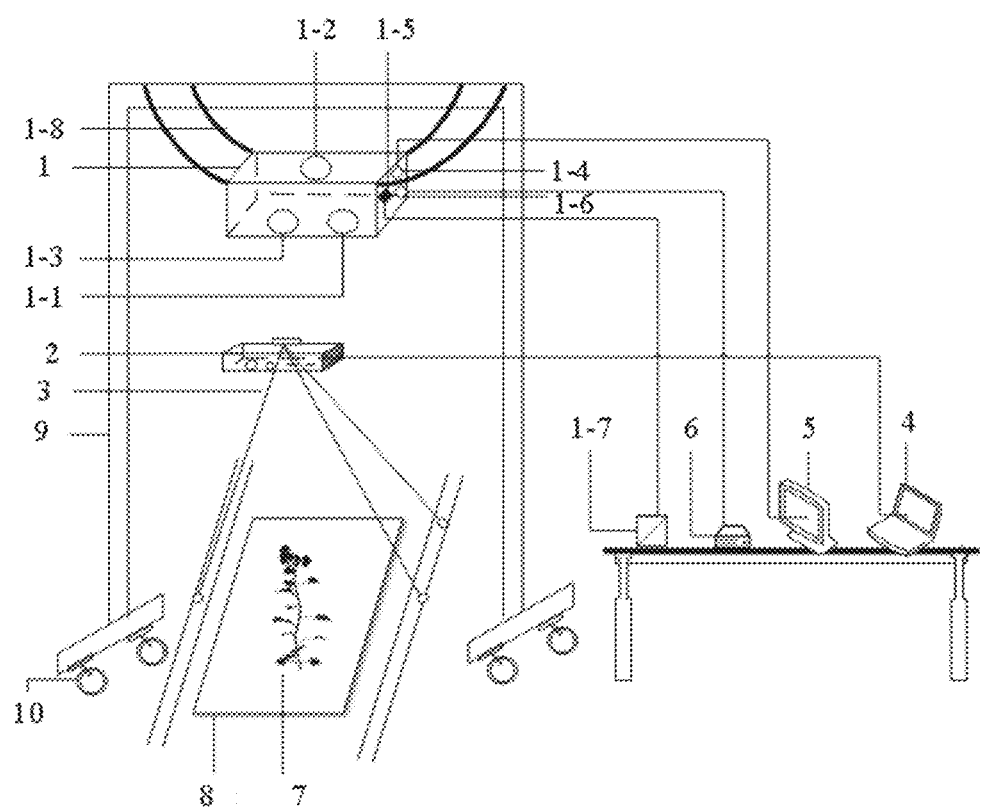
FIG. 1 is a schematic diagram of a device for crop canopy chlorophyll fluorescence three-dimensional distribution information acquisition according to the present invention.

In the drawings: 1—canopy chlorophyll fluorescence detection device, 1-1—fluorescence-induced laser emitter, 1-2—LI-COR optical quantum sensor, 1-3—chlorophyll fluorescence sensor, 1-4—HDMI port, 1-5—24V power input port, 1-6—USB3.0 port, 1-7—voltage converter, 1-8—iron chain, 2—3D camera, 3—triangular support, 4—computer system, 5—display, 6—mobile storage device, 7—crop to be tested, 8—black background plate, 9—movable rack, 10—universal wheel.

DETAILED DESCRIPTION OF THE EMBODIMENTS

The present invention will be further described in detail below with reference to drawings and embodiments, but the protection scope of the present invention is not limited thereto.

As shown in FIG. 1, a device for crop canopy chlorophyll fluorescence three-dimensional distribution information acquisition includes a canopy chlorophyll fluorescence detection device 1, a 3D camera 2, a triangular support 3, a computer system 4, a display 5, a mobile storage device 6, a crop to be tested 7, a black background plate 8, a movable rack 9, and a universal wheel 10. The canopy chlorophyll fluorescence detection device 1 is suspended below the movable rack 9 by four iron chains 1-8, and the movable rack 9 is capable of moving to right above the crop to be tested 7. The crop to be tested 7 is placed on the black background plate 8. The 3D camera 2 is located obliquely above the crop to be tested 7, and is mounted on the triangular support 3, and is connected to the computer system 4. The canopy chlorophyll fluorescence detection device 1 includes: a LI-COR optical quantum sensor 1-2 disposed at the top and configured to measure a light intensity, a chlorophyll fluorescence sensor 1-3 disposed at the bottom and configured to acquire chlorophyll fluorescence data reflected by the crop to be tested, a fluorescence-induced laser emitter 1-1 disposed at the bottom and configured to use a short pulse laser to excite chlorophyll fluorescence of the crop to be tested 7, an HDMI port 1-4, a 24V power input port 1-5, a USB3.0 port 1-6, and a voltage converter 1-7. The 24V power input port 1-5 is connected to the mains through the voltage converter 1-7, and the HDMI port 1-4 is connected to the display 5, to display a fluorescence parameter monitoring interface and a fluorescence information acquisition manner setting interface. When the canopy chlorophyll fluorescence detection device 1 operates, the fluorescence-induced laser emitter 1-1 emits a short pulse laser to the crop to be tested 7. The LI-COR optical quantum sensor 1-2 measures a light intensity of an environment around the crop to be tested 7. The chlorophyll fluorescence sensor 1-3 acquires chlorophyll fluorescence data reflected by the crop canopy to be tested 7. The canopy chlorophyll fluorescence detection device 1 saves the acquired light intensity of the environment around the crop to be tested 7 and the acquired chlorophyll fluorescence data, is connected to the mobile storage device 6 through the USB3.0 port 1-6, and copies the saved data to the computer system 4. Universal wheels 10 each having a locking paddle are mounted below the movable rack 9 to allow the track to move or lock the rack.

In this example, the crop to be tested 7 is cucumber, the canopy chlorophyll fluorescence detection device 1 is the Cropobserver canopy chlorophyll fluorescence detection device manufactured by Phenotrait, the Netherlands, the 3D camera 2 is Microsoft's Kinect V2 depth camera, and the computer system 4 is Windows 10 system. The information acquisition control function of the 3D camera 2 implements the acquisition of color images and depth images in Visual studio 2017, the calibration function of the 3D camera 2 is implemented in MATLAB 2018 by a checkerboard calibration kit based on the principle of Zhengyou Zhang's calibration, and the point cloud acquisition function and the chlorophyll fluorescence information characterization visualization function of the 3D camera 2 are implemented by calling a point cloud library (PCL) and a computer vision library (Open Source Computer Vision Library, OpenCV) in Visual studio 2017. Visual studio 2017 and MATLAB 2018 are software running in the computer system 4.

Figure 2:
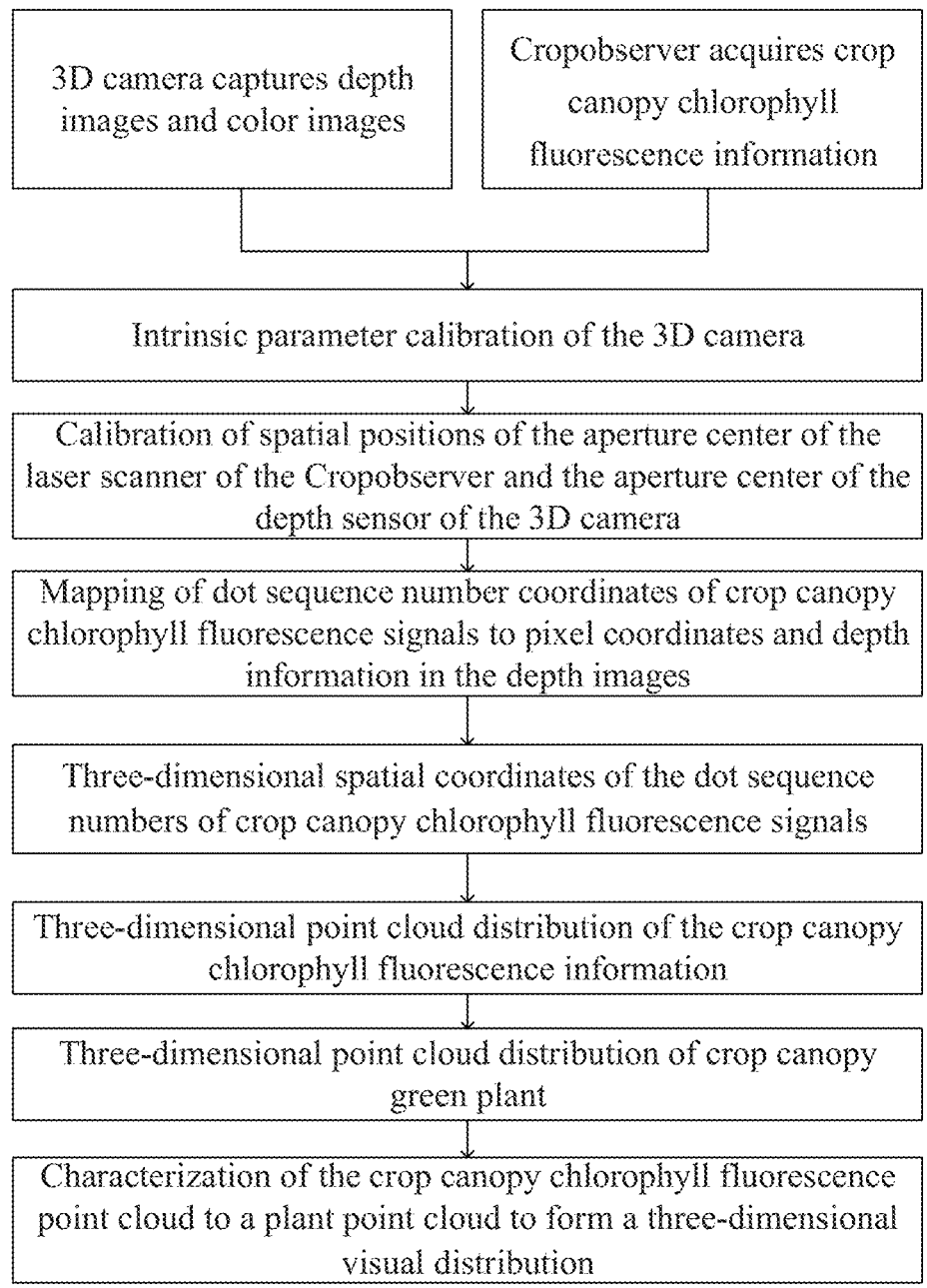
FIG. 2 is a flowchart of a method for crop canopy chlorophyll fluorescence three-dimensional distribution information acquisition according to the present invention.

As shown in FIG. 2, a method for crop canopy chlorophyll fluorescence three-dimensional distribution information acquisition specifically includes the following steps:

Step 1. The canopy chlorophyll fluorescence detection device 1 is disposed.

Figure 3A:
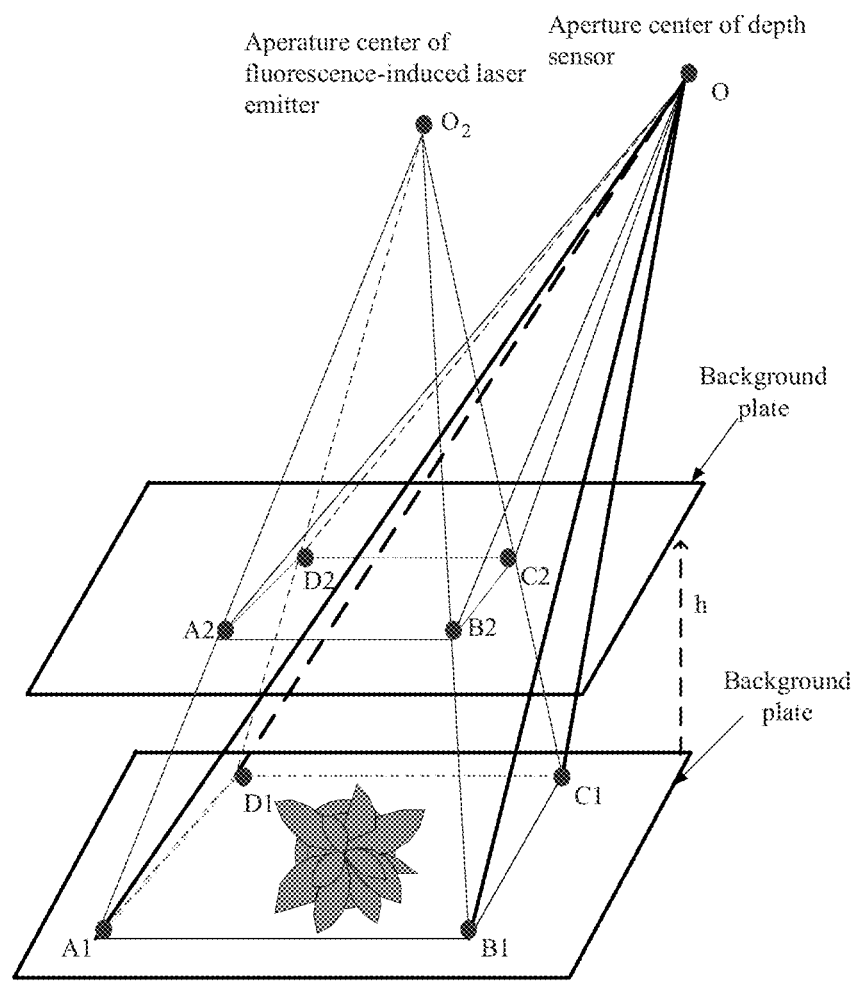
FIG. 3A and FIG. 3B are schematic diagrams showing position calibration and point selection of CropObserver and a 3D camera according to the present invention, where
Figure 3B:
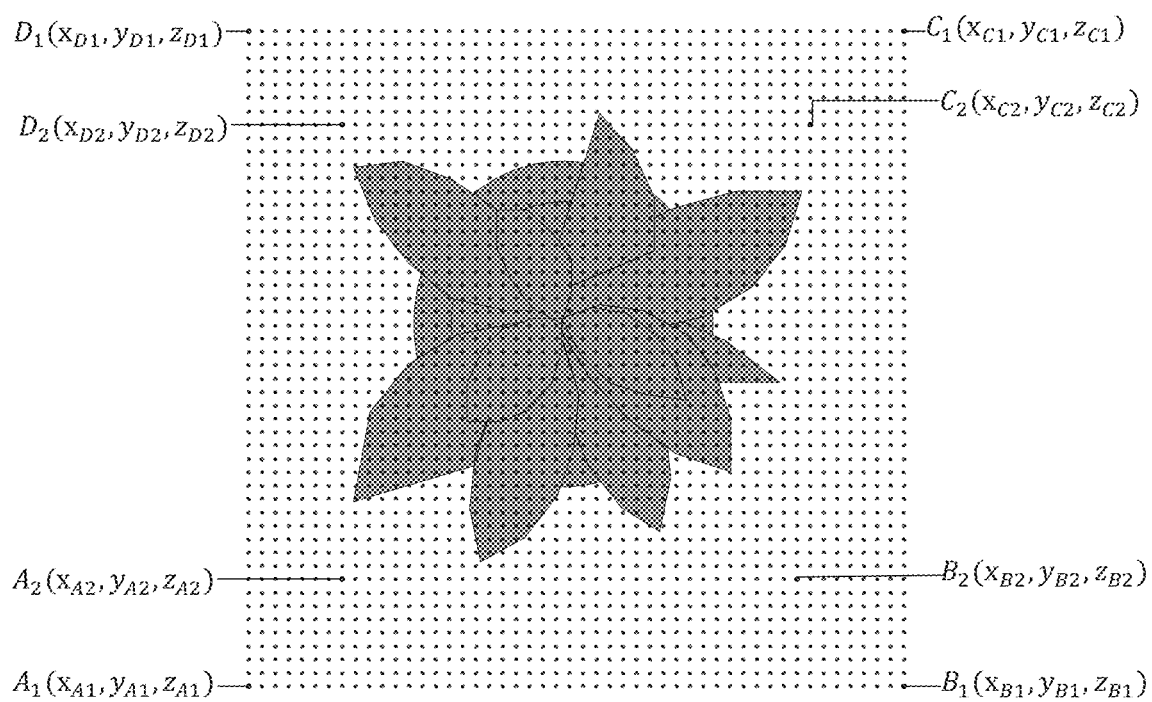

The movable rack 9 carries the canopy chlorophyll fluorescence detection device 1 to move to the top of the crop canopy to be tested 7. After initialization of the measurement device, "Centre" and "Test Meas" buttons in the setting interface are successively pressed, to cause laser dots emitted from the fluorescence-induced laser emitter 1-1 to point to the center of the crop to be tested 7. A measurement range is set, so that a range of dots generated by the fluorescence-induced laser emitter 1-1 surrounds the crop to be tested 7. As shown in FIG. 3A and FIG. 3B, the fluorescence-induced laser emitter 1-1 projects four laser dots at the edge. Because the full scanning range of the fluorescence-induced laser emitter is 34° in a row direction and 40° in a column direction, a scanning angle ratio of the horizontal axis is set to $m_1$, and a scanning angle ratio of the longitudinal axis is set to $m_2$, so that the four points at the edge can surround the crop to be tested 7. A number of dots in an array generated by the fluorescence-induced laser emitter 1-1 is set, where a number of dots generated by the canopy chlorophyll fluorescence detection device 1 in the row direction is set to e, and a number of dots generated in the column direction is set to f. "Start scan" is clicked to cause the canopy chlorophyll fluorescence detection device 1 to start operating.

Step 2. Image acquisition and calibration of the 3D camera 2.

In this example, the 3D camera 2 has a color sensor resolution of 1920×1080, and a depth sensor resolution of 512×424. Visual studio 2017 is run in the computer system 4, and a computer vision library (Open Source Computer Vision Library, OpenCV) and a camera SDK are called, to respectively acquire depth frames data to arrays (DepthFrameDate) and color frames data to arrays (ColorSpacePoint), and respectively saves them as a depth image and a color image. A MapDepthFrameToColorSpace( ) function based on the principle of bilinear interpolation is used to calculate a mapping relationship between the depth image and the color image according to depth frame information, and pixel coordinates in the depth image are mapped to the color image, so that coordinates of pixels in the depth image are mapped to coordinates in the color image, to obtain a 512*424 array. Elements of the array are coordinates in the color image that correspond to the depth image, and contain color information. The array is saved as a mapped color image.

Mapped color images corresponding to different positions of a checkerboard calibration plate are acquired. The mapped color images are input to Zhengyou Zhang's calibration toolkit in MATLAB 2018. A corner distance of the checkerboard is input.

Valid calibration pictures are screened to obtain n checkerboard images with a calibration plot error of less than 0.2 pixels for calibration, where n>20. Then a camera intrinsic matrix is exported:

$$InstrinsicMatrix = \begin{bmatrix} f_x & 0 & c_x \\ 0 & f_y & c_y \\ 0 & 0 & 1 \end{bmatrix} \quad (1)$$

where $f_x = f*sx$, $f_y = f*sy$, f is the focal length of the camera (measured in mm), [sx, sy] represents the number of pixels per millimeter in the (x, y) direction, $f_x$ and $f_y$ respectively represent focal lengths of the camera on the x axis and the y axis (measured in pixels), and [cx, cy] is the aperture center of the camera.

Step 3. Calibration point information capture between the canopy chlorophyll fluorescence detection device 1 and the 3D Camera.

As shown in FIG. 3A and FIG. 3B, the fluorescence-induced laser emitter 1-1 emits four laser dots at the edge. Four red laser dots $A_1$, $B_1$, $C_1$, and $D_1$ at the edge are shown on the background plate 8. The camera 2 sequentially captures depth images and mapped color images of the laser dots $A_1$, $B_1$, $C_1$, and $D_1$. The background plate 8 is raised by h meters, and red laser dots $A_2$, $B_2$, $C_2$, and $D_2$ at the edge are shown on the background plate 8. The camera 2 sequentially captures depth images and mapped color images of the laser dots $A_2$, $B_2$, $C_2$, and $D_2$. Based on the calibration method for the camera 2 in step 2, the camera 2 is respectively calibrated before and after the background plate 8 is raised, to obtain intrinsic matrices: Intrinsic Matrix-a and Intrinsic Matrix-b.

Step 4. World coordinates of calibration edge points are extracted.

Figure 4:
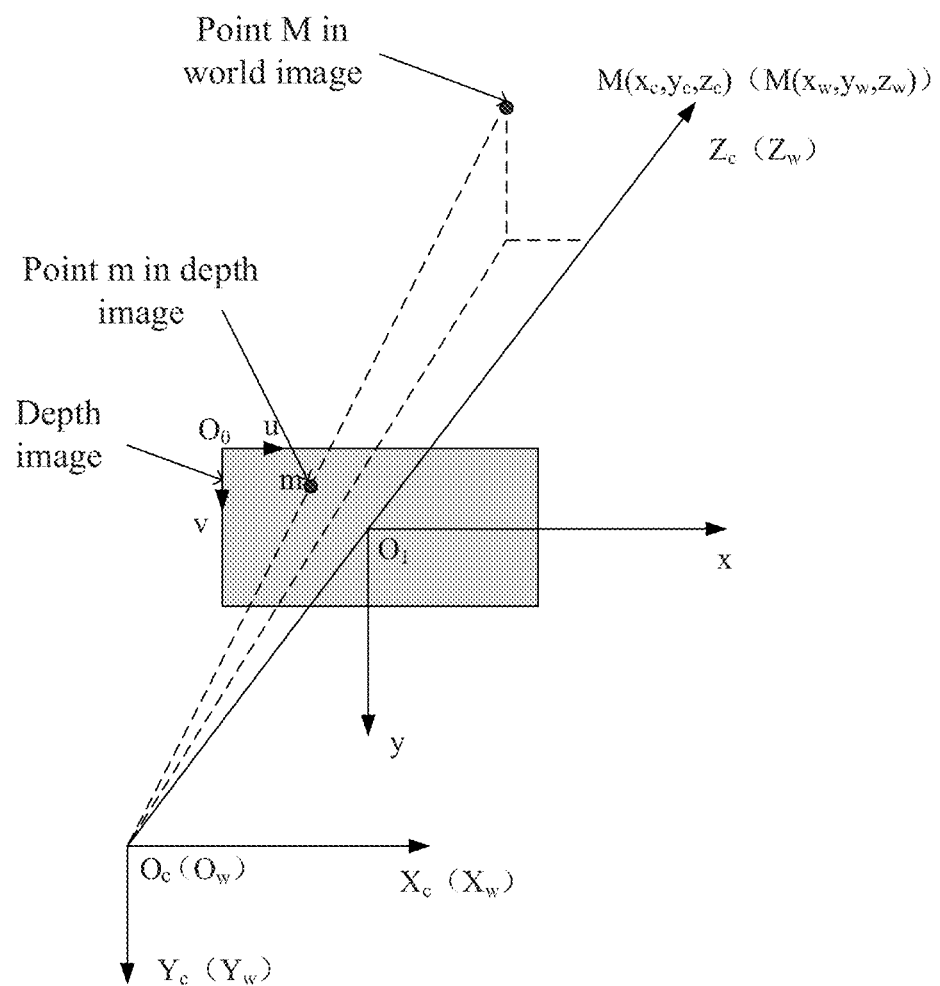
FIG. 4 is a schematic diagram of a model structure of a 3D camera according to the present invention.

A model structure of the 3D camera 2 is as shown in FIG. 4. In FIG. 4, $O_0$-uv is a pixel coordinate plane of the depth image, and an origin $O_0$ is at the upper left corner of the imaging plane of the depth image, measured in pixels; $O_1$-xy is an image coordinate system, with an origin $O_1$ being in the center of the imaging plane of the depth image, measured in mm, and coordinates of $O_1$ in the pixel coordinate plane are $(u_0, v_0)$; $O_c$-$X_cY_cZ_c$ is a coordinate system of the 3D camera 2, with an origin $O_c$ being at an aperture center of the depth sensor in the 3D camera; a distance between $O_c$ and $O_1$ is the focal length f Because the pixel size of the depth image captured by the camera 2 is 512×424, the camera 2 has different focal lengths on the x axis and the y axis, which are respectively recorded as $f_x$ and $f_y$. In this example, the origin of coordinates of the camera coordinate system coincides with the origin of coordinates of the world coordinate system. $O_w$-$X_wY_wZ_w$ is the world coordinate system of the camera 2, and coincides with the camera coordinate system $O_c$-$X_cY_cZ_c$. A point m is any point in the depth image, and its coordinates in the pixel coordinate plane are (u, v). The point m is mapped to three-dimensional coordinates $M(x_c, y_c, z_c)$ in the camera coordinate system, where $z_c$ represents a principal axis value of camera coordinates, i.e., the distance from a target to the camera. The point m is mapped to three-dimensional coordinate $M(x_w, y_w, z_w)$ in the world coordinate system. Because the processing process is separated performed on a single depth image, the origin of world coordinates coincides with the origin of the camera, so the coordinates of point M are recorded as M(x, y, z). According to the geometrical relationship in FIG. 4, a correspondence between the spatial point M(x, y, z) and the pixel coordinates m(u, v, d) (where d refers to depth data in the depth image) of this point in the image is:

$$\begin{cases} u = \dfrac{xf_x}{z} + u_0 \\ v = \dfrac{xf_y}{z} + v_0 \\ d = z \times s \end{cases} \quad (2)$$

where $(u_0, v_0)$ is the pixel coordinates of the aperture center of the camera; and s is a scaling factor, i.e., a ratio of the depth value to an actual application, and s is generally set to 1000.

A back calculation formula (2) may be written as follows: when a point m(u, v, d) is known, a corresponding spatial coordinate point M(x, y, z) is derived:

$$\begin{cases} x = \dfrac{(u - u_0) \times d}{sf_x} \\ y = \dfrac{(v - v_0) \times}{sf_{y_x}} \\ z = \dfrac{d}{s} \end{cases} \quad (3)$$

The depth images and the mapped color images of the four red laser dots $A_1$, $B_1$, $C_1$, and $D_1$ at the edge and the four red laser dots $A_2$, $B_2$, $C_2$, and $D_2$ at the edge that are acquired in step 3 are imported into Matlab 2018. For the color image, the color image is grayed using a super red grayscale factor 2R-G-B (where R, G, and B are three color channel components: red, green, and blue), to acquire red characteristics of the laser dots at the edge, and obtain clear edge points. The pixel coordinates of the edge points are extracted: $(u_{A1}, v_{A1})$, $(u_{B1}, v_{B1})$, ... , and $(u_{D2}, v_{D2})$. $(u_{A1}, v_{A1})$, $(u_{B1}, v_{B1})$, ... , and $(u_{D2}, v_{D2})$ are mapped to the depth image, to obtain depths $d_{A1}$, $d_{B1}$, ..., and $d_{D2}$. With reference to the intrinsic matrices Intrinsic Matrix-a and Intrinsic Matrix-b in step 3, spatial coordinate points of $A_1$, $B_1$, $C_1$, $D_1$, $A_2$, $B_2$, $C_2$, and $D_2$ are acquired: $(x_{A1}, y_{A1}, z_{A1})$, $(x_{B1}, y_{B1}, z_{B1})$, ..., and $(x_{D2}, y_{D2}, z_{D2})$.

Step 5. A spatial position of an aperture center $O_2$ of the fluorescence-induced laser emitter relative to the 3D camera 2 is calibrated.

According to the coordinates of the spatial coordinate points $A_1$, $B_1$, $C_1$, $D_1$, $A_2$, $B_2$, $C_2$, and $D_2$ acquired in step 4, spatial linear equations passing through $A_1 A_2$, $B_1 B_2$, $C_1 C_2$, and $D_1 D_2$ are set up, which are respectively recorded as straight lines $l_1$, $l_2$, $l_3$, and $l_4$. Assume that the linear equations are as follows:

$$\begin{cases} l_1 : (x_{A1} - x_{A2})x + (y_{A1} - y_{A2})y + (z_{A1} - z_{A2})z + N_1 = 0 \\ l_2 : (x_{B1} - x_{B2})x + (y_{B1} - y_{B2})y + (z_{B1} - z_{B2})z + N_2 = 0 \\ l_3 : (x_{C1} - x_{C2})x + (y_{C1} - y_{C2})y + (z_{C1} - z_{C2})z + N_3 = 0 \\ l_4 : (x_{D1} - x_{D2})x + (y_{D1} - y_{D2})y + (z_{D1} - z_{D2})z + N_4 = 0 \end{cases} \quad (4)$$

In the above linear equations, $N_1$, $N_2$, $N_3$, and $N_4$ are constants. By substituting points $A_1$, $B_1$, $C_1$, and $D_1$ into the straight lines $l_1$, $l_2$, $l_3$, and $l_4$ respectively, the constants $N_1$, $N_2$, $N_3$, and $N_4$ can be calculated, and then the four linear equations $l_1$, $l_2$, $l_3$, and $l_4$ can be solved.

Because the points $A_1$, $B_1$, $C_1$, $D_1$, $A_2$, $B_2$, $C_2$, and $D_2$ are emitted from the aperture center $O_2$ of the fluorescence-induced laser emitter, all the straight lines $l_1$, $l_2$, $l_3$, and $l_4$ pass through the point $O_2$. It is assumed that the spatial coordinates of the aperture center of the fluorescence-induced laser emitter relative to the camera are $O_2(a, b, c)$, including three unknowns a, b, and c. By substitution into any three of the above linear equations, the spatial coordinates $O_2(a, b, c)$ of the aperture center of the fluorescence-induced laser emitter relative to the camera can be calculated.

Step 6. The canopy chlorophyll fluorescence detection device 1 acquires chlorophyll fluorescence information of the crop to be tested.

The number of dots generated by the Cropobserver in the x-axis direction is set to e=50, and that in the y-axis direction is set to f=50, a boundary for dots generated by the fluorescence-induced laser emitter 1-1 is $A_1$, $B_1$, $C_1$, and $D_1$, and a 50×50 dot array is formed, where sequence numbers in the array are recorded as (g, h) (1≤g≤50, 1≤h≤50). Neighboring dots are spaced from each other in the row direction by the same distance, which is recorded as a constant $n_1$. Neighboring dots are spaced from each other in the column direction by the same distance, which is recorded as a constant $n_2$. The value of $$\frac{n_1}{n_2}$$

equals to a ratio $$\frac{m_1}{m_2}$$

between scanning angle ratios in the row direction and the column direction. "Start scan" is clicked to start measurement. The fluorescence-induced laser emitter 1-1 generates dots in the following order: first generating a dot at point $A_1$, the sequence number of the dot being recorded as (1, 1); generating 49 dots in a direction toward point $D_1$ at equal intervals of $n_1$, the sequence number of the dot at point $D_1$ being recorded as (1, 50); then generating a dot at a position that is distant from point $A_1$ downward by a distance $n_2$, the sequence number of the dot being recorded as (2, 1); then generating 49 dots in a direction toward point $D_1$ downward by a distance $n_2$, the sequence number of the dot that is distant from $D_1$ downward by $n_2$ being recorded as (2, 50); then generating a dot at a position that is distant from point $A_1$ downward by a distance $2n_2$, the sequence number of the dot being recorded as (3, 1), and then generating 49 dots in a direction toward point $D_1$ downward by a distance $2n_2$ at intervals of $n_1$, the sequence number of the dot that is distant from $D_1$ downward by $2n_2$ being recorded as (3, 50); and so on. Dots are generated in sequence based on the above rule, the sequence number of the dot at point $B_1$ being recorded as (50, 1). Finally, a dot is generated at point $C_1$, the sequence number of the dot at point C, being recorded as (50, 50). The position of the measurement point is changed every 5 seconds, and the chlorophyll fluorescence sensor 1-3 acquires and stores a position at which the crop to be tested 7 reflects chlorophyll fluorescence and fluorescence data of this position.

The canopy chlorophyll fluorescence detection device 1 mainly measures the following parameters: (1) photochemical efficiency: maximum photochemical efficiency $$\frac{Fv}{Fm}$$

of leaves under dark adaptation, and actual photochemical efficiency $$\frac{F'_q}{F'_m}$$

leaves under light adaptation; (2) PAR: relative light intensity on the leaf surface; (3) rETR: relative electron transfer rate in leaves. $Fv=Fm-F_0$, where Fm is maximum chlorophyll fluorescence measured under dark adaptation conditions, and $F_0$ is an initial value of the chlorophyll fluorescence parameter measured under dark adaptation conditions; $F_q'=F_m'-F_t$, where $F_m'$ is maximum fluorescence under light adaptation, i.e., a fluorescence intensity when all PSII reaction centers are closed under light adaptation, and $F_t$ is real-time fluorescence of the crop after receiving light for a period of time t; the relative electron transfer rate $rETR=0.425\times(F_q'/F_m')\times PAR$. When the canopy chlorophyll fluorescence detection device 1 operates, the computer system 4 captures depth images and mapped color images of the crop to be tested 7 using the 3D camera 2, where the depth images including pixel and depth information are expressed as (u',v',d'), and the color images including three color channels, red r', green g', and blue b', are expressed as (u',v',r',g',b').

Step 7. The depth images and the mapped color images of the crop to be tested are converted to point clouds for displaying.

A point cloud library (PCL) and a computer vision library (Open Source Computer Vision Library, OpenCV) are called in Visual studio 2017, and by traversing (u',v',d') acquired in step 6, the crop depth images are converted based on formula (3) into spatial coordinate points (X, Y, Z), which are saved in a matrix XYZ of three columns, respectively named X, Y, and Z. The three color channel components red, green, and blue of (r', g', b') acquired in step 6 are separated to form three channel components r, g, and b, which are respectively saved in a matrix RGB of three columns, respectively named R, G, and B. Point cloud plots are generated from the matrix components X, Y, Z, R, G, and B by using a pointcloud function for point cloud generation.

Step 8. Segmentation is performed for the crop canopy to be tested.

The point cloud plots in step 7 also contain background point cloud information in addition to the crop to be tested. The point cloud plots in step 6 are processed using a super green grayscale operation (2R-G-B), to highlight the green crop point cloud part. A binarization thresholding operator THRESH_OTSU in OpenCV is used for thresholding, to separate the green crop point cloud.

Step 9. Dot sequence number coordinates of effective chlorophyll fluorescence signals are mapped to pixel coordinates in the depth images and the mapped color images.

The sequence numbers (g, h) of the dots generated by the canopy chlorophyll fluorescence detection device 1 in step 6 corresponding to the pixel coordinates $(u_{A1}, v_{A1})$, $(u_{B1}, v_{B1})$, $(u_{C1}, v_{C1})$, and $(u_{D1}, v_{D1})$ of the edge points in step 4 are respectively (1, 1), (e, 1), (e, f), and (1, f), and pixel pitches $p_x$ and $p_y$ corresponding to head-to-tail distances between the dots generated by the canopy chlorophyll fluorescence detection device 1 in the row direction and the column direction are respectively:

$$p_x = \frac{\sqrt{(u_{A1}-u_{B1})^2+(v_{A1}-v_{B1})^2} + \sqrt{(u_{C1}-u_{D1})^2+(v_{C1}-v_{D1})^2}}{2} \text{ and}$$

$$p_y = \frac{\sqrt{(u_{A1}-u_{D1})^2+(v_{A1}-v_{D1})^2} + \sqrt{(u_{B1}-u_{C1})^2+(v_{B1}-v_{C1})^2}}{2},$$

where the dot sequence numbers (g, h) are evenly distributed in the pixel coordinate plane. The pixel pitch between neighboring dots generated by the fluorescence-induced laser emitter in the row direction is recorded as $\Delta_x$, and the pixel pitch between neighboring dots generated by the fluorescence-induced laser emitter in the column direction is recorded as $\Delta_y$. Assuming that a dot array generated by the fluorescence-induced laser emitter is e×f, $$\Delta_x = \frac{p_x}{e-1}, \text{ and } \Delta_y = \frac{p_y}{f-1}.$$

The pixel coordinates in the depth images captured by the camera corresponding to the dot sequence numbers (g, h) are recorded as points (u", v"), where $u''=(g-1)\Delta_x+u_{D1}$, and $v''=(h-1)\Delta_y+v_{D1}$. A sequence number of a dot with a chlorophyll fluorescence signal recorded in a cycle of the canopy chlorophyll fluorescence detection device 1 is found. Coordinate information and chlorophyll fluorescence information of this sequence number are sequentially saved in a row in Text1 in the following order: g', h', $$\frac{Fv}{Fm}\left(\frac{F'_q}{F'_m}\right),$$

PAR, rETR The depth images corresponding to (g, h) are (u''', v''', d'''), $u'''=(g'-1)\Delta_x+u_{D1}$, and $v'''=(h'-1)\Delta_y+v_{D1}$. The pixel coordinates, depth information and chlorophyll fluorescence information of the depth image are sequentially saved in a row in Text2 in the following order: u''', v''', d''', $$\frac{Fv}{Fm}\left(\frac{F'_q}{F'_m}\right),$$

PAR, rETR.

Step 10. A chlorophyll fluorescence information signal sequence of the crop canopy to be tested are correspondingly characterized to spatial coordinates using the aperture center of the depth sensor as a spatial coordinate origin.

Based on the coordinate conversion method in formula (3), the first three columns of pixel and depth coordinates (u''', v''', d''') in Text2 are converted into spatial coordinates (x', y', z') using the aperture center of the depth sensor as a spatial coordinate origin, which are sequentially saved, together with the last three columns in Text2, in a row in Text3 in the following order: x', y', z', $$\frac{Fv}{Fm}\left(\frac{F'_q}{F'_m}\right),$$

PAR, rETR.

Step 11. A chlorophyll fluorescence information signal sequence of the crop canopy to be tested are correspondingly characterized to spatial coordinates using the aperture center of the fluorescence-induced laser emitter as a spatial coordinate origin.

According to the spatial coordinates (x', y', z') using the aperture center of the depth sensor as the spatial coordinate origin in step 10, the spatial coordinates $O_2$(a, b, c) of the aperture center of the fluorescence-induced laser emitter relative to the camera have been obtained in step 5, and thus spatial coordinates of effective chlorophyll fluorescence signals using the aperture center of the fluorescence-induced laser emitter as the origin of space are (x'+a, y'+b, z'+c).

Step 12. Three-dimensional visualization of the canopy chlorophyll fluorescence information of the crop to be tested is performed.

The last three columns of data in Text3 are converted into $$\frac{100Fv}{Fm}\left(\frac{100F'_q}{F'_m}\right),$$

PAR/10, and rETR, so that their value ranges are 0 to 255, i.e., the three columns of chlorophyll fluorescence information data fall within value ranges of the red, green, and blue color channels. Data is sequentially saved in a row in Text4 in the following order: x', y', z', $$\frac{100Fv}{Fm}\left(\frac{100F'_q}{F'_m}\right),$$

0, 0. Data is sequentially saved in a row in Text5 in the following order: x', y', z', 0, PAR/10, 0. Data is sequentially saved in a row in Text6 in the following order: x', y', z', 0, 0, rETR. Data is sequentially saved in a row in Text7 in the following order: x'+a, y'+b, z'+c, $$\frac{100Fv}{Fm}\left(\frac{100F'_q}{F'_m}\right),$$

0, 0. Data is sequentially saved in a row in Text8 in the following order: x'+a, y'+b, z'+c, 0, PAR/10, 0. Data is sequentially saved in a row in Text9 in the following order: x'+a, y'+b, z'+c, 0, 0, rETR. The PCL and the OpenCV are called in Visual studio 2017. Point clouds pointcloud-Yield-Kinect, pointcloud-PAR-Kinect, and pointcloud-rETR-Kinect that include spatial coordinates and chlorophyll fluorescence information and use the aperture center of the depth sensor as an origin are respectively generated based on data in Text4-Text6 by using a pointcloud function for point cloud generation. Point clouds pointcloud-Yield-CropObserver, pointcloud-PAR-CropObserver, and pointcloud-rETR-CropObserver that include spatial coordinates and chlorophyll fluorescence information and use the aperture center of the fluorescence-induced laser emitter as an origin are respectively generated based on data in Text7-Text9 by using a pointcloud function for point cloud generation.

The point clouds including the spatial coordinates and the chlorophyll fluorescence information are characterized to the green crop point cloud separated in step 8 by using a pcshowpair( ) function, to form a three-dimensional visual distribution of the chlorophyll fluorescence information on the plant.

Step 13. Crop canopy chlorophyll fluorescence three-dimensional point cloud distribution information is acquired for different growth sequences of the crop to be tested. In this example, the growth of the cucumber crop is divided into a germination period, a seedling period, a flowering period and a fruiting period, and three-dimensional point cloud distribution information of the chlorophyll fluorescence of the crop canopy to be tested is acquired by performing steps 1 to 12.

The embodiments are exemplary embodiments of the present invention, but the present invention is not limited to the above-mentioned embodiments. Any obvious improvement, replacement or variation that can be made by one skilled in the art without departing from the spirit of the present invention belongs to the protection scope of the present invention.

What is claimed is:
1. A method for crop canopy chlorophyll fluorescence three-dimensional (3D) distribution information acquisition, comprising:
respectively obtaining depth images and mapped color images of laser dots emitted by a fluorescence-induced laser emitter on a background plate before and after raising by using a 3D camera, and calibrating the depth images and the mapped color images to obtain camera intrinsic matrices;
obtaining spatial coordinates of the laser dots based on pixel coordinates of edge points in the color images and depth values of the edge points in the depth images in combination with the camera intrinsic matrices;
obtaining a spatial linear equation according to the spatial coordinates of the laser dots, and solving spatial coordinate $O_2(a, b, c)$ of an aperture center of the fluorescence-induced laser emitter relative to the 3D camera;
acquiring chlorophyll fluorescence information of a crop canopy to be tested, mapping dot sequence number coordinates (g', h') of effective chlorophyll fluorescence signals to pixel coordinates in the color images and depth information (u''', v''', d''') of the depth images; correspondingly characterizing (u''', v''', d''') to spatial coordinates (x', y', z') using an aperture center of a depth sensor in the 3D camera as a spatial coordinate origin, and correspondingly characterizing a chlorophyll fluorescence information signal sequence of the crop canopy to be tested to spatial coordinates (x'+a, y'+b, z'+c) using the aperture center of the fluorescence-induced laser emitter as a spatial coordinate origin;
performing three-dimensional visualization of the chlorophyll fluorescence information of the crop canopy to be tested; respectively generating, based on data in Text4-Text6 by using a pointcloud function for point cloud generation, point clouds pointcloud-Yield-Kinect, pointcloud-PAR-Kinect, and pointcloud-rETR-Kinect that comprise spatial coordinates and chlorophyll fluorescence information and use the aperture center of the depth sensor as an origin; respectively generating, based on data in Text7-Text9 by using the pointcloud function for point cloud generation, point clouds pointcloud-Yield-CropObserver, pointcloud-PAR-CropObserver, and pointcloud-rETR-CropObserver that comprise spatial coordinates and chlorophyll fluorescence information and use the aperture center of the fluorescence-induced laser emitter as an origin; wherein the Text4 comprises data x', y', z',

$$\frac{100Fv}{Fm}\left(\frac{100F'_q}{F'_m}\right),$$

0, and 0, the Text5 comprises data x', y', z', 0, PAR/10, and 0, the Text6 comprises data x', y', z', 0, 0, and rETR, the Text7 comprises data x'+a, y'+b, z'+c, $$\frac{100Fv}{Fm}\left(\frac{100F'_q}{F'_m}\right),$$

0, and 0, the Text8 comprises data x'+a, y'+b, z'+c, 0, PAR/10, and 0, the Text9 comprises data x'+a, y'+b, z'+c, 0, 0, and rETR;

$$\frac{Fv}{Fm}$$

is a maximum photochemical efficiency of leaves under dark adaptation, $$\frac{F'_q}{F'_m}$$

is an actual photochemical efficiency of the leaves under light adaptation, PAR is a relative light intensity on a leaf surface, and rETR is a relative electron transfer rate in the leaves; and characterizing the point clouds comprising the spatial coordinates and the chlorophyll fluorescence information to a separated green crop point cloud by using a pcshowpair( ) function, to form a three-dimensional visual distribution of the chlorophyll fluorescence information of the crop canopy.

2. The method for crop canopy chlorophyll fluorescence three-dimensional distribution information acquisition according to claim 1, wherein
the spatial coordinates of the laser dots are expressed as M(x, y, z), and $$\begin{cases} x = \dfrac{(u - u_0) \times d}{sf_x} \\ y = \dfrac{(v - v_0) \times d}{sf_{yx}} \\ z = \dfrac{d}{s} \end{cases}$$

wherein u, v, and d are pixel coordinates of the laser dots in the image, s is a ratio of a depth value to an actual depth, $f_x$ and $f_y$ respectively represent focal lengths of the 3D camera on x axis and y axis, and ($u_0$, $v_0$) are pixel coordinates of an aperture center of the 3D camera.

3. The method for crop canopy chlorophyll fluorescence three-dimensional distribution information acquisition according to claim 1, wherein
the $$\dfrac{100Fv}{Fm}\left(\dfrac{100F'_q}{F'_m}\right),$$

PAR/10, and rETR have a value range of 0-255.

4. The method for crop canopy chlorophyll fluorescence three-dimensional distribution information acquisition according to claim 1, wherein
dot sequence numbers (g, h) corresponding to pixel coordinates ($u_{A1}$, $v_{A1}$), ($u_{B1}$, $v_{B1}$), ($u_{C1}$, $v_{C1}$), and ($u_{D1}$, $v_{D1}$) of edge points of the mapped color images are respectively (1, 1), (e, 1), (e,f), and (1,f), and
pixel coordinates, which are corresponding to the dot sequence numbers (g, h), in the depth images captured by the 3D camera are recorded as points (u", v"),
wherein u"=(g−1)$\Delta_x$+$u_{D1}$, and v"=(h−1)$\Delta_y$+$v_{D1}$, wherein e is a number of dots generated by a canopy chlorophyll fluorescence detection device in a row direction, and f is a number of dots generated by the canopy chlorophyll fluorescence detection device in a column direction.

5. The method for crop canopy chlorophyll fluorescence three-dimensional distribution information acquisition according to claim 4, wherein $$u'''=(g'-1)\Delta_x+u_{D1}, \ v'''=(h'-1)\Delta_y+v_{D1},$$

wherein $\Delta_x$ is a pixel distance between neighboring dots generated by the fluorescence-induced laser emitter in the row direction, and $\Delta_y$ is a pixel distance between neighboring dots generated by the fluorescence-induced laser emitter in the column direction.

6. The method for crop canopy chlorophyll fluorescence three-dimensional distribution information acquisition according to claim 5, wherein $$\Delta_x = \dfrac{p_x}{e-1}, \text{ and } \Delta_y = \dfrac{p_y}{f-1},$$

wherein $p_x$ and $p_y$ are respectively pixel pitches corresponding to head-to-tail distances between dots generated by the canopy chlorophyll fluorescence detection device in the row direction and the column direction.

7. The method for crop canopy chlorophyll fluorescence three-dimensional distribution information acquisition according to claim 6, wherein $$p_x = \dfrac{\sqrt{(u_{A1}-u_{B1})^2+(v_{A1}-v_{B1})^2} + \sqrt{(u_{C1}-u_{D1})^2+(v_{C1}-v_{D1})^2}}{2}.$$

8. The method for crop canopy chlorophyll fluorescence three-dimensional distribution information acquisition according to claim 6, wherein $$p_y = \dfrac{\left(\sqrt{(u_{A1}-u_{D1})^2+(v_{A1}-v_{D1})^2} + \sqrt{(u_{B1}-u_{C1})^2+(v_{B1}-v_{C1})^2}\right)}{2}.$$

9. The method for crop canopy chlorophyll fluorescence three-dimensional distribution information acquisition according to claim 1, further comprising:
acquiring canopy chlorophyll fluorescence three-dimensional distribution information of different growth sequences of crops to be tested.

10. A device for crop canopy chlorophyll fluorescence three-dimensional distribution information acquisition for the method according to claim 1, comprising:
a canopy chlorophyll fluorescence detection device,
a 3D camera and
a computer system,
wherein the 3D camera is connected to the computer system,
Visual studio 2017 and MATLAB 2018 are run in the computer system, and
the Visual studio 2017 calls a point cloud library and a computer vision library to realize three-dimensional visualization of chlorophyll fluorescence information of crops to be tested.

11. The device according to claim 10, wherein
the spatial coordinates of the laser dots are expressed as M(x, y, z), and $$\begin{cases} x = \dfrac{(u - u_0) \times d}{sf_x} \\ y = \dfrac{(v - v_0) \times d}{sf_{yx}} \\ z = \dfrac{d}{s} \end{cases}$$

wherein u, v, and d are pixel coordinates of the laser dots in the image, s is a ratio of a depth value to an actual depth, $f_x$, and $f_y$, respectively represent focal lengths of the 3D camera on x axis and y axis, and ($u_0$, $v_0$) are pixel coordinates of an aperture center of the 3D camera.

12. The device according to claim 10, wherein the $$\frac{100Fv}{Fm}\left(\frac{100F'_q}{F'_m}\right),$$

PAR/10, and rETR have a value range of 0-255.

13. The device according to claim 10, wherein
dot sequence numbers (g, h) corresponding to pixel coordinates ($u_{A1}$, $v_{A1}$), ($u_{B1}$, $v_{B1}$), ($u_{C1}$, $v_{C1}$), and ($u_{D1}$, $v_{D1}$) of edge points of the mapped color images are respectively (1, 1), (e, 1), (e,f), and (1,f), and
pixel coordinates, which are corresponding to the dot sequence numbers (g, h), in the depth images captured by the 3D camera are recorded as points (u", V"),
wherein u"=(g−1)$\Delta_x$+$u_{D1}$, and v"=(h−1)$\Delta_y$+$v_{D1}$, wherein e is a number of dots generated by a canopy chlorophyll fluorescence detection device in a row direction, and f is a number of dots generated by the canopy chlorophyll fluorescence detection device in a column direction.

14. The device according to claim 13, wherein $u'''=(g'-1)\Delta_x+u_{D1}$, $v'''=(h'-1)\Delta_y+v_{D1}$, wherein $\Delta_x$ is a pixel distance between neighboring dots generated by the fluorescence-induced laser emitter in the row direction, and $\Delta_y$ is a pixel distance between neighboring dots generated by the fluorescence-induced laser emitter in the column direction.

15. The device according to claim 14, wherein $$\Delta_x = \frac{p_x}{e-1}, \text{ and } \Delta_y = \frac{p_y}{f-1},$$

wherein $p_x$ and $p_y$ are respectively pixel pitches corresponding to head-to-tail distances between dots generated by the canopy chlorophyll fluorescence detection device in the row direction and the column direction.

16. The device according to claim 15, wherein $$p_x = \frac{\sqrt{(u_{A1}-u_{B1})^2+(v_{A1}-v_{B1})^2} + \sqrt{(u_{C1}-u_{D1})^2+(v_{C1}-v_{D1})^2}}{2}.$$

17. The device according to claim 15, wherein $$p_y = \frac{\left(\sqrt{(u_{A1}-u_{D1})^2+(v_{A1}-v_{D1})^2} + \sqrt{(u_{B1}-u_{C1})^2+(v_{B1}-v_{C1})^2}\right)}{2}.$$

18. The device according to claim 10, further comprising:
acquiring canopy chlorophyll fluorescence three-dimensional distribution information of different growth sequences of crops to be tested.

* * * * *